United States Patent [19]

Reamey et al.

[11] Patent Number: 5,405,551
[45] Date of Patent: Apr. 11, 1995

[54] METHOD OF MAKING LIQUID CRYSTAL COMPOSITE

[75] Inventors: Robert H. Reamey, Palo Alto; John Mazzanti, Santa Rosa; Mark Wartenberg, San Jose; Gil Garza, Fremont; John Havens, Menlo Park; Anne Gonzales, Pleasanton; Kathleen DiZio, Palo Alto; Harriette Atkins, Mountain View; Kevin Malloy, Belmont, all of Calif.

[73] Assignee: Raychem Corporation, Menlo Park, Calif.

[21] Appl. No.: 217,581

[22] Filed: Mar. 24, 1994

[51] Int. Cl.⁶ .......................... C09K 19/52; G02F 1/13
[52] U.S. Cl. .......................... 252/299.01; 252/299.1; 359/51; 359/52
[58] Field of Search .......................... 252/299.01, 299.1; 359/51, 52, 103; 428/1

[56] References Cited

U.S. PATENT DOCUMENTS

| | | | |
|---|---|---|---|
| 4,435,047 | 3/1984 | Fergason | 350/334 |
| 4,643,528 | 2/1987 | Bell, Jr. | 350/334 |
| 4,688,900 | 8/1987 | Doane et al. | 350/347 V |
| 4,818,070 | 4/1989 | Gunjima et al. | 350/334 |
| 4,834,509 | 5/1989 | Gunjima et al. | 350/347 V |
| 4,950,052 | 8/1990 | Fergason et al. | 350/334 |
| 4,992,201 | 2/1991 | Pearlman | 252/299.1 |
| 5,202,063 | 4/1993 | Andrews et al. | 264/4.6 |
| 5,206,747 | 4/1993 | Wiley et al. | 359/51 |
| 5,216,530 | 6/1993 | Pearlman et al. | 350/43 |
| 5,335,101 | 8/1994 | Reamey | 359/52 |

FOREIGN PATENT DOCUMENTS

| | | |
|---|---|---|
| 0313053A2 | 4/1989 | European Pat. Off. |
| 0421240A2 | 4/1991 | European Pat. Off. |
| 3-288823 | 12/1991 | Japan |
| 4-007518 | 1/1992 | Japan |
| 4-240614 | 8/1992 | Japan |
| 6-003652 | 1/1994 | Japan |

WO93/18431 9/1993 WIPO .

OTHER PUBLICATIONS

Andomenas et al., "Influence Of Plasticizers On The Values Of Operational Voltages Of Microencapsulated Liquid Crystals," *Mol. Cryst. Liq. Cryst.*, vol. 215, pp. 153–160 (1992).

Schadt et al., "Influence Of Solutes On Material Constants Of Liquid Crystals And On Electro-Optical Properties Of Twisted Nematic Displays," *J. Chem. Phys.*, vol. 65, No. 6, pp. 2224–2230 (1976).

Koval'chuk et al., "Electrooptical Effects In The Polymer Dispersed Nematic Liquid Crystals: Response Time," *Mol. Cryst. Liq. Cryst.*, vol. 193, pp. 217–221 (1990).

Nomura et al., "Interfacial Interation Between Nematic Liquid Crystal And Polymer In The Composite Film Consisting Of Nematic Liquid Crystal And Connected Polymer Microspheres," *Jap. J. Appl. Phys.*, vol. 30, No. 2, pp. 327–330 (Feb. 1991).

Hirai et al., "Phase Diagram And Phase Separation in LC/Prepolymer Mixture," *SPIE Vol. 1257 Liq. Cryst. Displays and Applications*, pp. 2–8 (1990).

*Primary Examiner*—Shean Wu
*Attorney, Agent, or Firm*—Herbert G. Burkard; Yuan Chao

[57] ABSTRACT

A method is described for making a liquid crystal composite in which droplets of a liquid crystal material dispersed in a matrix material. An encapsulating material at least partially separates the liquid crystal material from the matrix material. This construction permits the matrix material to be selected on the basis of its processing and environmental properties and the encapsulating material to be selected on the basis of its emulsifying ability and orientational interactions with liquid crystal material. Light valves made from such a composite exhibit improved electro-optical properties.

13 Claims, 4 Drawing Sheets

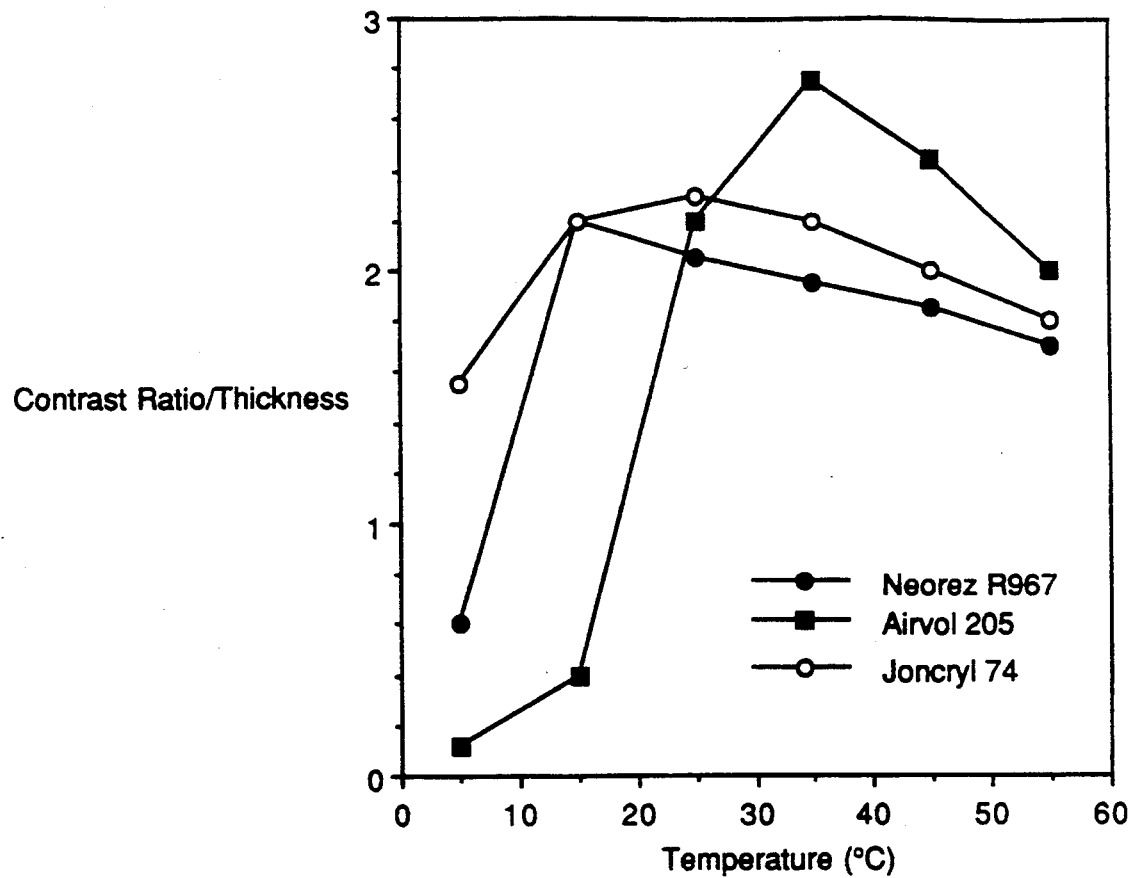
Fig._3

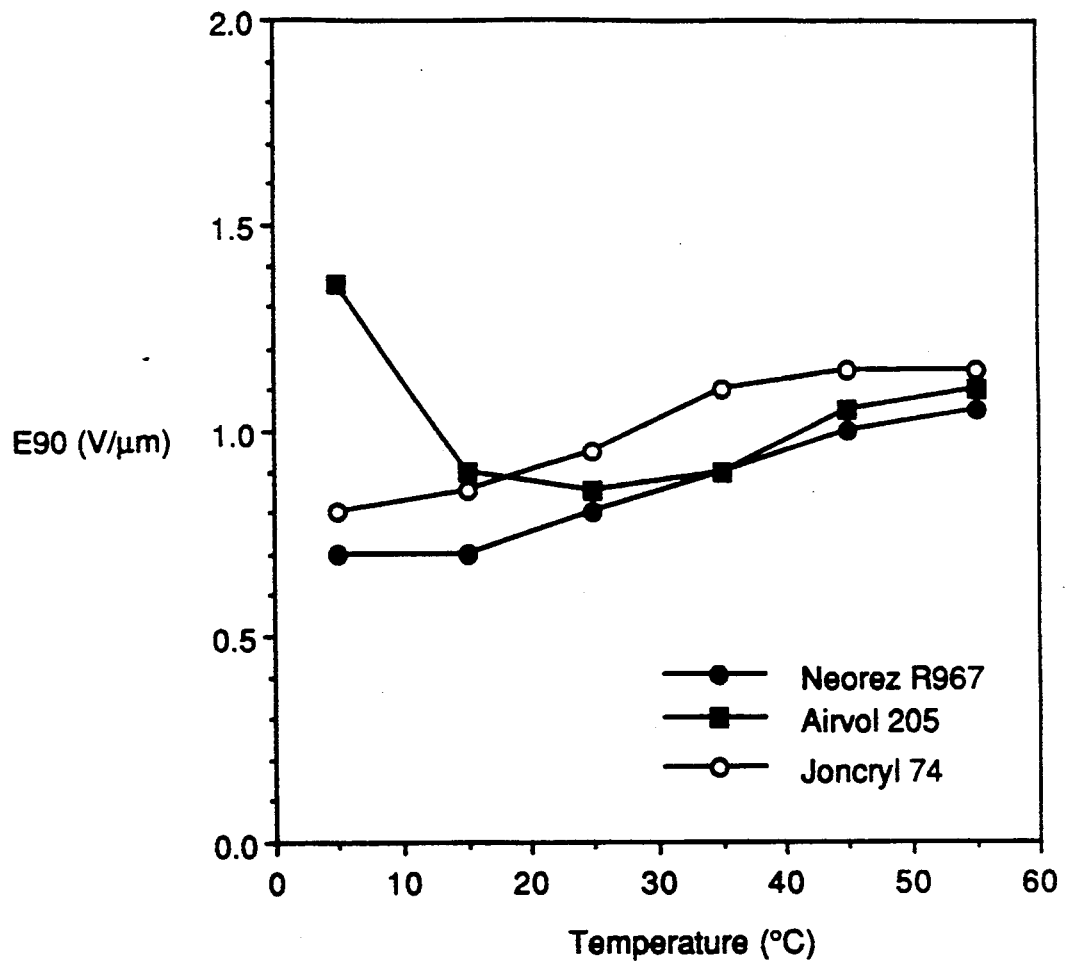
Fig._4

2

METHOD OF MAKING LIQUID CRYSTAL COMPOSITE

TECHNICAL FIELD OF THE INVENTION

This invention relates to liquid crystal composites suitable for use in light valves and methods of making the same.

BACKGROUND OF THE INVENTION

Liquid crystal light valves in which the electro-optically active element is a liquid crystal composite in which plural volumes or droplets of a liquid crystal material are dispersed, encapsulated, embedded, or otherwise contained within a matrix material such as a polymer are known. Exemplary disclosures include Fergason, U.S. Pat. No. 4,435,047 (1984) ("Fergason '047"); West et al., U.S. Pat. No. 4,685,771 (1987); Pearlman, U.S. Pat. No. 4,992,201 (1991); Dainippon Ink, EP 0,313,053 (1989), the disclosures of which are incorporated herein by reference. These light valves may be used in displays and window or privacy panels.

The prior art also discloses the concept of having a further material disposed between the matrix material and the liquid crystal material. See, for example, Fergason, '047; Fergason et al., U.S. Pat. No. 4,950,052 (1990) ("Fergason '052"); and Raychem, WO 93/18431 (1993) ("Raychem '431"). The purpose of having this further material has been variously stated as preserving the integrity of the volumes of liquid crystal material and for altering the electro-optical properties of the composite.

However, the techniques disclosed for forming a composite with this intervening further material have been specialized and are not generally applicable to a wide variety of materials. The present invention provides an improved process for making such composites, which is more generally applicable than those disclosed in the prior art.

SUMMARY OF THE INVENTION

There is provided a method for making a liquid crystal composite wherein plural volumes of a liquid crystal material are dispersed in a matrix material and the liquid crystal material is at least partially separated from the matrix material by an encapsulating material disposed therebetween, which method comprises the steps of:

(a) emulsifying a combination of the liquid crystal material, the encapsulating material, and a carrier medium to form an emulsion in which capsules comprising a volume of liquid crystal material contained within the encapsulating material are suspended in the carrier medium;

(b) separating the capsules from the carrier medium;

(c) dispersing the capsules in a medium in which the matrix material or a precursor thereof is present; and (d) causing the matrix material or precursor thereof to set around the capsules, to form the liquid crystal composite.

BRIEF DESCRIPTION OF THE DRAWING(S)

FIG. 3 shows the contrast performance of various devices made according to this invention as a function of temperature.

FIG. 4 shows the operating voltage as a function of temperature for various devices made according to this invention as a function of temperature.

DESCRIPTION OF THE PREFERRED EMBODIMENTS

Figure 1A:
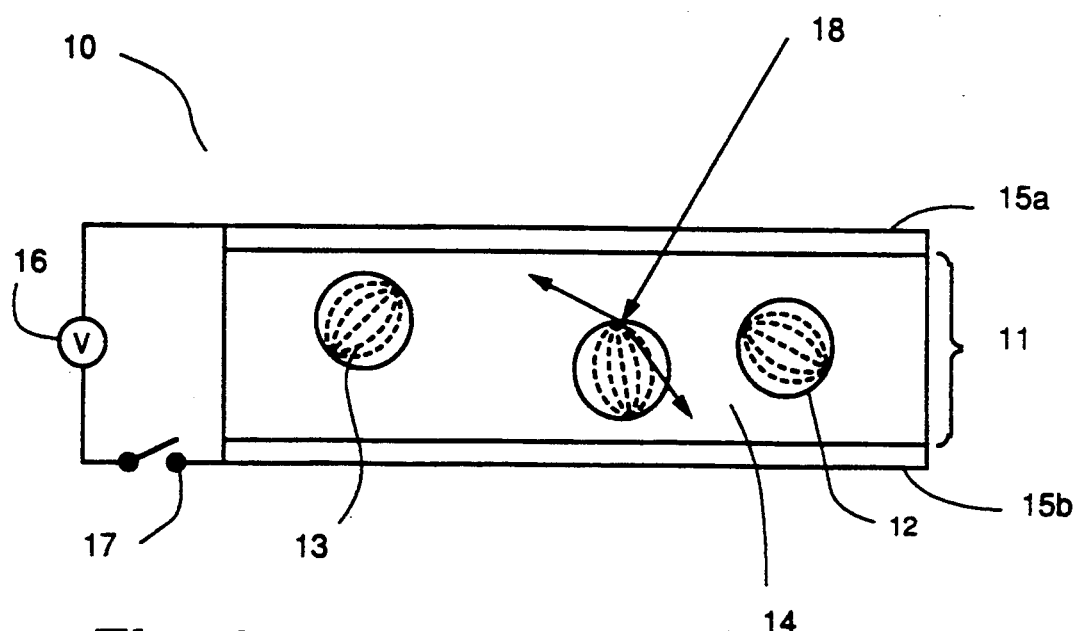
FIG. 1a–1b show a prior light valve made from a liquid crystal composite.

Fig. 1a shows a prior art light valve made from a liquid crystal composite, such as described in Fergason '047. Light valve 10 comprises a liquid crystal composite 11 in which droplets or volumes 12 of nematic liquid crystal material 13 having a positive dielectric anisotropy are dispersed in a matrix material 14. Composite 11 is sandwiched between first and second electrodes 15a and 15b, made from a transparent conductor such as indium tin oxide ("ITO"). The application or not of a voltage across electrodes 15a and 15b from power source 16 is controlled by switch 17, shown here in the open position ("off-state"). As a result, no voltage is impressed across composite 11 and the electric field experienced by liquid crystal material 13 is effectively zero. Due to surface interactions, the liquid crystal molecules preferentially lie with their long axes parallel to the curved interface with matrix material 14, resulting in a generally curvilinear alignment within each droplet. The curvilinear axes in different droplets 12 are randomly oriented, as symbolized by the differing orientations of the curvilinear patterns. Liquid crystal material 13 has an extraordinary index of refraction $n_e$ which is different from the index of refraction $n_m$ of matrix material 14 and an ordinary index of refraction $n_o$ which is the substantially the same as $n_m$. (Herein, two indices or refraction as said to be substantially the same, or matched, if they differ by less than 0.05, preferably less than 0.02.) Incident light ray 18 traveling through composite 11 has a high statistical probability of encountering at least one interface between matrix material 14 and liquid crystal material 13 in which the liquid crystal index of refraction with which it operatively interacts is $n_e$. Since $n_e$ is different from $n_m$, there is refraction, or scattering of light ray 18, both forwardly and backwardly, causing composite 11 to have a translucent or frosty appearance.

Figure 1B:
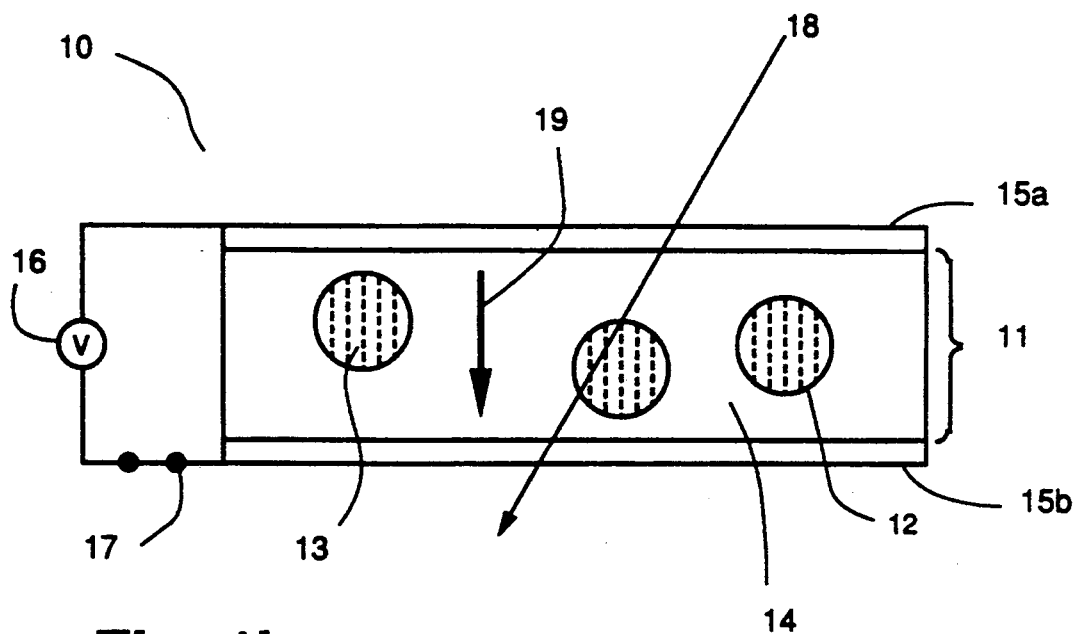

Fig. 1b shows light valve 10 in the on-state, with switch 17 closed. An electric field is applied between electrodes 15a and 15b and across composite 11, with a directionality indicated by arrow 19. Liquid crystal material 13, being positively dielectrically anisotropic, aligns parallel to the electric field direction. (The required voltage is dependent inter alia on the thickness of the composite and typically is between 3 and 50 volts.) Further, this alignment with the field occurs in each droplet 12, so that there is order among the directors from droplet to droplet, as shown symbolically in Fig. 1b. When the liquid crystal molecules are aligned in this manner, the liquid crystal index of refraction with which incident light ray 18 operatively interacts is $n_o$. Because $n_o$ is substantially the same as $n_m$, there is no scattering at the liquid crystal-matrix material interface. As a result, ray 18 is transmitted through composite 11, which now appears transparent. Transmission rates of at least 50%, and preferably on the order of 70% or higher, may be attained.

The electro-optical performance (e.g., switching voltage, off-state scattering, switching speed, and hysteresis) of light valve 10 is dependent on the nature of the surface interactions between matrix material 14 and liquid crystal material 13. A matrix material which is desirable in respect of characteristics such as mechanical properties, ability to protect against environmental contaminants, UV stability, etc. may be undesirable in respect of its surface interactions with the liquid crystal material, for example causing the switching speed to be too slow or the switching voltage to be too high. Thus, it is desirable to be able to divorce the surface interactions from the other characteristics of the matrix material.

Figure 2A:
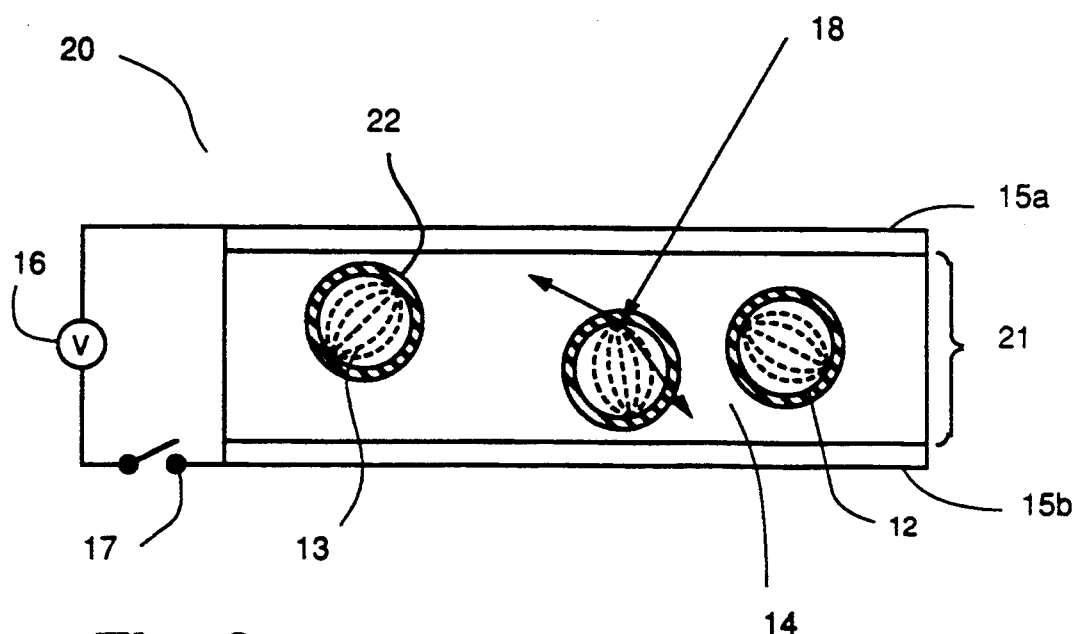
FIG. 2a–2b show a light valve made from a liquid crystal composite made according to the present invention.
Figure 2B:
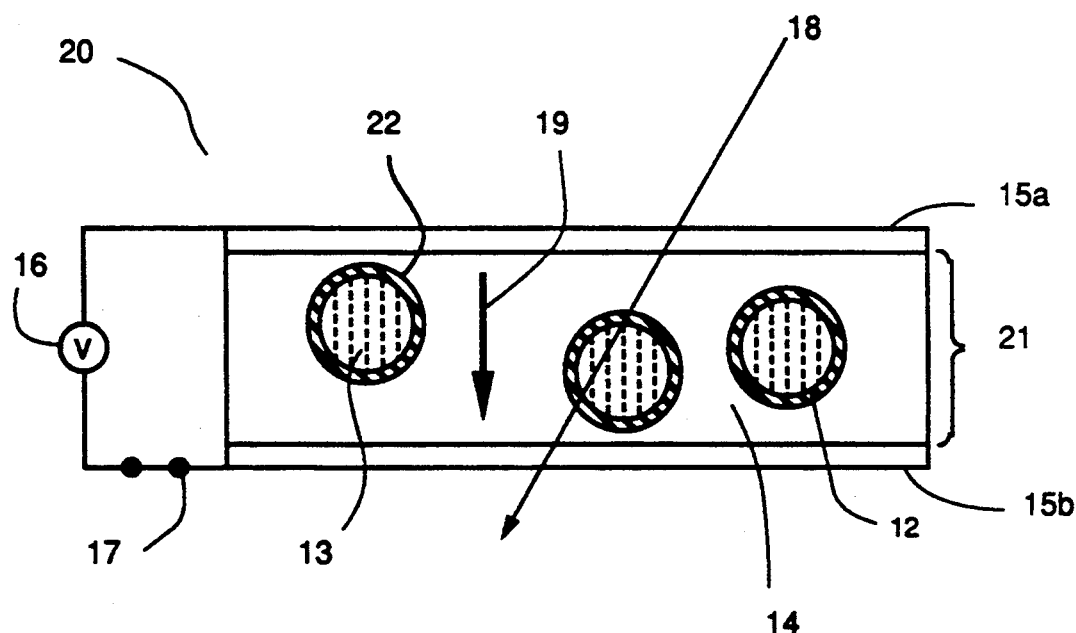

FIG. 2a–2b (where numerals repeated from Fig. 1a–b denote like elements) show a light valve 20 of this invention in which this objective is achieved. Light valve 20 comprises a liquid crystal composite 21 which is similar to composite 11 of FIG. 1a–b, except that liquid crystal material 13 is separated from matrix material 14 by an encapsulating material 22. Light valve 20 appears frosty or translucent in the off-state (FIG. 2a) and transparent in the on-state (FIG. 2b), for the reasons given above. The surface interactions affecting the alignment of liquid crystal material 13 are predominantly with encapsulating material 22 and not with matrix material 14. Encapsulating material 22 may be selected on the basis of its interactions with liquid crystal material 13, while matrix material 14 may be selected on the basis of its mechanical, optical, or other properties. This way, the necessity to compromise in respect of one set or another of properties is avoided.

Matching of $n_o$ of the liquid crystal material with the index of refraction of the encapsulating material is important only if the thickness of the layer of encapsulating material is comparable to the wavelength of light. Generally the thickness is less than approximately 100 nm, much less than the wavelengths of 400 to 700 nm for visible light, so that the matching of the indices of refraction is normally not necessary. However, where the layer of encapsulating material is thick or where minimizing of on-state haze is an objective (e.g., in window applications), matching of the indices of refraction is desirable. A colored visual effect may be obtained by inclusion of dyes, either pleochroic or isotropic, in the liquid crystal material.

In order to obtain the advantages of the present invention, it is not necessary that encapsulating material 22 completely separates matrix material 14 from liquid crystal material 13. It is sufficient that encapsulating material 22 at least partially separates the latter two materials, so that the switching characteristics (speed, voltage, hysteresis, etc.) of light valve 20 are generally characteristic of an encapsulating material-liquid crystal material interface and not of a matrix material-liquid crystal material interface. Preferably, encapsulating material 22 effectively separates matrix material 14 and liquid crystal material 13, by which is meant that the interfaces of liquid crystal material 13 are primarily with encapsulating material 22 and not with matrix material 14.

In the foregoing figures the droplets or volumes 12 of liquid crystal material 13 have been shown as having a spherical shape as a matter of convenience and that other shapes are possible, for example oblate spheroids, irregular shapes, or dumbbell-like shapes in which two or more droplets are connected by channels. Also, the thickness of the layer of encapsulating material 22 and the size of droplets 12 have been greatly exaggerated for clarity.

In the method of the present invention, an emulsion containing capsules in which a volume of liquid crystal material is contained within an encapsulating material is prepared initially. (The term "capsule" should not be construed to mean necessarily spherical shapes. See the analogous discussion above in the context of the shape of the liquid crystal droplets.) An emulsion may be prepared by rapidly agitating a mixture of liquid crystal material, encapsulating material, and a carrier medium, typically water. Optionally, an emulsifier, wetting agent, or other surface active agent may be added. Suitable emulsification techniques are disclosed in Fergason '047, Fergason '052, Raychem '431, and Andrews et al., U.S. Pat. No. 5,202,063 (1993), the disclosures of which are incorporated herein by reference.

Suitable encapsulating materials include poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof. A combination of an aqueous carrier medium and a encapsulating material which is soluble or colloidally dispersible in the aqueous carrier medium is particularly preferred. Although surface active agents may be employed, it is generally preferred that the encapsulating material be capable of forming capsules containing the liquid crystal material without their addition. In such cases, the encapsulating material itself should have good surface active properties (i.e., be a good emulsifier). A class of polymers having such characteristics are amphiphilic polymers containing both hydrophilic and lipophilic segments. Examples of this class include partially hydrolyzed poly(vinyl acetates) (e.g., Airvol TM 205 from Air Products), ethylene-acrylic copolymers (e.g., Adcote TM, from Dow Chemical), and styrene-acrylic acid-acrylate terpolymers (e.g., Joncryl TM from S. C. Johnson).

The capsules next are separated from the carrier medium. A preferred separation method is to centrifuge the emulsion, causing the capsules to settle to the bottom and then removing the supernatant carrier medium. Gravity settling may also be used. Yet another separation method is spray-drying, in which the emulsion is sprayed onto a surface and allowed to dry via evaporation of the carrier medium. It is not necessary that the separation be complete, that is, that all the carrier medium be removed. It is only necessary that the majority of the carrier medium be removed.

The isolated capsules are dispersed in a medium comprising the matrix material or a precursor thereof (e.g., a monomer which can be polymerized into a matrix material). The matrix material or precursor thereof is then allowed to set, to form a composite in which the matrix material is at least partially separated from the liquid crystal material by the encapsulating material. By "set," it is meant that the matrix material hardens into a continuous resinous phase capable of containing dispersed therein plural volumes of liquid crystal material, with the intervening layer of encapsulating material. The matrix material may set by evaporation of a solvent or a carrier medium such as water or by the polymerization of a precursor monomer.

Suitable matrix materials include polyurethanes, poly(vinyl alcohol), epoxies, poly(vinyl pyrrolidone), poly(ethylene glycol), poly(acrylic acid) and its copolymers, poly(hydroxy acrylate), cellulose derivatives, silicones, acrylates, polyesters, styrene-acrylic acid-acrylate terpolymers, and mixtures thereof. The matrix material (especially in the instance of a polyurethane) may be in latex or dispersed form. Preferred matrix materials are polyurethane and styrene-acrylic acid-acrylate terpolymer (e.g., Joncryl TM from S. C. Johnson). Blends of polymers may be used. For example a preferred matrix material is a blend of two different polyurethanes one (R967, available from ICI Resins) selected for it high quality coating and lamination characteristics and one (R966, available from ICI Resins) selected for its resistance to stress clearing. Those skilled in the art will recognize from the overlap between the above lists of preferred encapsulating and matrix materials that, depending on when it is introduced in the process step, a given material may be either the encapsulating material or the matrix material.

A particularly preferred combination of encapsulating material and matrix material is poly(vinyl alcohol) as the encapsulating material and polyurethane as the matrix material. The poly(vinyl alcohol) is desirable as an encapsulating material because is an excellent emulsion stabilizer for the liquid crystal material. Poly(vinyl alcohol) stabilized emulsions can be separated into concentrated pellets without agglomeration. They can also be centrifuged for capsule size control. Polyurethane is a desirable matrix material because it is good for coating and lamination and has good retention of properties in high humidity. The poly(vinyl alcohol)/polyurethane combination has a lower operating voltage than using poly(vinyl alcohol) alone. Also, poly(vinyl alcohol) is a better barrier material against environmental contaminants other than water, while polyurethane is a better barrier material against water (or water vapor).

It can be advantageous to crosslink, physically entangle molecular chains, or otherwise ensure that the encapsulating material is fixed in place, so that displacement by the matrix material is minimized.

The method of this invention may be combined with the method of copending, commonly assigned application of Havens et al., entitled "Liquid Crystal Composite and Method of Making," Ser. No. 08/217,268, filed Mar. 24, 1994, the disclosure of which is incorporated herein by reference, to make novel composites. Devices made with a combination of these methods can exhibit wider operating temperature ranges, better coatings with high liquid crystal loadings, low operating voltages, good voltage-holding performance, and can provide these benefits all in a single device.

In the above discussions, particular those with reference to Fig. 1a–b and FIG. 2a–b, have been in the context of nematic liquid crystals having a positive dielectric anisotropy, other types of liquid crystals may be encapsulated by the method of this invention. One may apply the techniques of this invention to liquid crystal composites in which the liquid crystal material is a chiral nematic (also known as cholesteric) one, such as disclosed in Crooker et al., U.S. Pat. No. 5,200,845 (1993) and Jones, copending commonly assigned application entitled "Chiral Nematic Liquid Crystal Composition and Devices Comprising the Same," Ser. No. 08/139382, filed Oct. 18, 1993.

The practice of this invention may be further understood by reference to the following examples, which are provided by way of illustration and not of limitation. All relative amounts are in parts by weight, unless specified otherwise.

EXAMPLE 1

Capsules of liquid crystal material 1005 (from Chisso) contained in Airvol TM 205 PVA (from Air Products) and having a volume median diameter of 2.48 μm were prepared and separated from the carrier medium by centrifugation at 13,500 rpm for 35 min to form a pellet of the capsules. The supernatant was drained off, and the pellet was dispersed in 6% PVA solution. This centrifugation process was repeated 15 times in order to narrow the droplet size distribution of the liquid crystal-containing emulsion. The resulting pellet was separated into portions, one of which was re-dispersed into a solution of PVA, the other was re-dispersed into Neorez TM polyurethane latex (ICI Resins), leading to emulsions with an 83:17 liquid crystal to (encapsulating-plus-matrix material) ratio and 60% solids.

Coatings onto ITO-glass were made which were between 5 and 8 μm thick. The samples with the Neorez TM polyurethane matrix operated at 25% lower field ($E_{90}=1.8$ volt/μm for the Neorez TM devices and 2.4 volt/μm for the PVA devices). It should be noted that without centrifugation the field needed to operate the devices would be significantly higher than 2.4 V/μm, and that centrifugation for droplet size control does not work well for Neorez stabilized LC emulsions.

EXAMPLE 2

Into a vial was weighed 16.0 g of liquid crystal TL205 (EM Industries), 3.1373 g of acrylate mixture PN393 (EM Industries) and 0.0627 of 1,1,1-trimethylolpropane trimethacrylate (Polysciences). This mixture was stirred until clear, then 18.1115 g of it was added into a beaker. To this beaker was added 20.12 g of a 10% w/w aqueous solution of PVA (Airvol TM 205) and 12.08 g of water. This mixture was mixed to yield an emulsion with a mean volume diameter of 1.91 μm as determined by Coulter counter. The emulsion was degassed overnight. The emulsion was divided into 5 batches, each of which was cooled with stirring for 30 min at 2°–4° C., then cured with a UV light source at 12 mW/cm$^2$ for 5 min. The portions were remixed, poured into a centrifuge tube and centrifuged for a total of 70 min. The supernatant was decanted leaving a pellet of centrifuged emulsion at the base of the tube. The pellet was determined to have 23% water by drying a portion of the pellet overnight at 60° C. Into a vial was added 1.1081 g of pellet and 1.1087 g of a 6.25% w/w aqueous solution of PVA (Airvol TM 205). The mixture was stirred gently with a spatula and filtered through a 5.0 μm membrane. In a laminar flow hood, the emulsion was coated onto an ITO-coated glass substrate with a doctor blade with a 2 mil (0.005 cm) gap. The film was allowed to dry for 45 min. A second ITO-glass substrate was laminated on top of the coating on an 85° C. hot plate. Three devices made in this manner were determined to have thicknesses of 6.98 μm, 6.67 μm, and 6.00 μm by interference measurements. The procedure described above was repeated, except the pellets were worked up in aqueous solutions of Neorez R967 polyurethane and Joncryl TM 74 styrene-acrylic acid-acrylate terpolymer, respectively. The devices with each of these three matrix materials were tested electro-optically at temperatures from 5° C. to 55° C. The results of these tests are shown in the attached graphs. The data plotted in FIG. 3 show the contrast ratio divided by thickness (CR/t) measured at f/3.5 at a number of temperatures for the devices described above. It is desirable to have a high value of CR/t, and it is desirable to have a high value over a wide temperature range. The data show that when the matrix material is PVA, the CR/t becomes very low at 15° C., making the composite less desirable for use in a display. By changing the matrix material to Neorez TM polyurethane, the CR/t at 15° C. is above 2 at 15° C., and by changing to Joncryl TM terpolymer, the CR/t is still above 1.5 at 5° C.

The data in FIG. 4 show the field needed to turn the above devices on to 90% ($E_{90}$) of the final transmittance. It is desirable to have a low value of $E_{90}$. Note that for the devices with PVA as the matrix material, the $E_{90}$ rises at low temperatures, whereas for the other two materials, the $E_{90}$ remains low at low temperature. These characteristics make the devices with the different matrix materials useful over a wider temperature range than when the same polymer (PVA) is used throughout. Other benefits of having Neorez TM or Joncryl TM as the matrix materials are that the coatings from the emulsions containing these two polymers were of significantly better quality (fewer defects), and lamination of ITO-glass was easier than for the devices using PVA only.

EXAMPLE 3

Into a small beaker was weighed 10.0 g of RY-1005 liquid crystal (Chisso) and 27.32 g of Adcote TM 50T4983 ethylene acrylic acid latex (Morton Thiokol). The components were mixed for 10 min at 10,000 rpm to yield an emulsion with a volume median droplet size of 2.7 $\mu$m. The emulsion was diluted by adding 16.0 g of a 6% aqueous Adcote solution to 15.443 g of emulsion. The diluted emulsion was then centrifuged at 10,000 rpm for 60 min. The supernatant solution was decanted and a pellet weighing 6.45 g was recovered. A portion of the pellet (2.93 g) was mixed with a 20% solution of 5.73 g of Airvol TM 205 poly(vinyl alcohol) (Air Products). Another portion of the pellet (2.40 g) was put back into Adcote by mixing with 3.85 g of a 6% aqueous Adcote solution. Devices were made from each of these emulsions by coating them onto ITO coated polyester film, drying, and laminating a second piece of ITO polyester film. The electro-optical properties of the devices were compared to each other and to a device made from poly(vinyl alcohol) alone. The composite device in which the encapsulating polymer was Adcote and the matrix polymer was poly(vinyl alcohol) had lower field of operation (5.7 V/$\mu$m) than the device made from all Adcote (7.5 V/$\mu$m), and faster switching speeds (1 msec rise, 3 msec fall) than the device from all poly(vinyl alcohol) (58 msec rise, 29 msec fall).

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method for making a liquid crystal composite wherein plural volumes of a liquid crystal material are dispersed in a matrix material and the liquid crystal material is at least partially separated from the matrix material by an encapsulating material disposed therebetween, which method comprises the steps of:
   (a) emulsifying a combination of the liquid crystal material, the encapsulating material, and a carrier medium to form an emulsion in which capsules comprising a volume of liquid crystal material contained within the encapsulating material are suspended in the carrier medium;
   (b) separating the capsules from the carrier medium;
   (c) dispersing the capsules in a medium in which the matrix material or a precursor thereof is present; and
   (d) causing the matrix material or precursor thereof to set around the capsules, to form the liquid crystal composite.

2. A method according to claim 1, wherein the capsules are separated from the carrier medium by centrifugation.

3. A method according to claim 1, wherein the liquid crystal material is a nematic liquid crystal material having positive dielectric anisotropy.

4. A method according to claim 3, wherein the index of refraction of the matrix material is substantially the same as the ordinary index of refraction of the liquid crystal material.

5. A method according to claim 3, wherein the index of refraction of the encapsulating material is substantially the same as the ordinary index of refraction of the liquid crystal material.

6. A method according to claim 3, wherein the index of refraction of the encapsulating and matrix materials and the ordinary index of refraction of the liquid crystal material are substantially the same.

7. A method according to claim 1, wherein the liquid crystal material is a chiral nematic liquid crystal material.

8. A method according to claim 1, wherein the encapsulating material is selected from the group consisting of poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

9. A method according to claim 1, wherein the matrix material is selected from the group consisting of polyurethanes, poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

10. A method according to claim 1, wherein the encapsulating material is a poly(vinyl alcohol) and the matrix material is a polyurethane.

11. A method according to claim 10, wherein the liquid crystal material is a nematic liquid crystal material having positive dielectric anisotropy.

12. A method according to claim 1, wherein the liquid crystal material includes a pleochroic dye.

13. A method according to claim 1, wherein the encapsulating material is fixed in place by crosslinking or physical entanglement of molecular chains.

* * * * *